United States Patent
Kunkel et al.

(10) Patent No.: US 9,834,118 B2
(45) Date of Patent: Dec. 5, 2017

(54) CAR SEAT MOBILITY SYSTEM

(71) Applicants: Troy Kunkel, Fort Worth, TX (US); Taylor P. Grant, Fort Collins, CO (US)

(72) Inventors: Troy Kunkel, Fort Worth, TX (US); Taylor P. Grant, Fort Collins, CO (US)

( * ) Notice: Subject to any disclaimer, the term of this patent is extended or adjusted under 35 U.S.C. 154(b) by 0 days.

(21) Appl. No.: 14/858,906

(22) Filed: Sep. 18, 2015

(65) Prior Publication Data

US 2017/0080829 A1    Mar. 23, 2017

(51) Int. Cl.
*B60N 2/28* (2006.01)
*B60B 33/00* (2006.01)
*B62B 7/12* (2006.01)
*B62B 9/20* (2006.01)

(52) U.S. Cl.
CPC .......... *B60N 2/2848* (2013.01); *B60B 33/006* (2013.01); *B60N 2/2821* (2013.01); *B60N 2/2845* (2013.01); *B62B 7/12* (2013.01); *B62B 9/20* (2013.01)

(58) Field of Classification Search
CPC ........... B60B 1/00; B60B 1/02; B60N 2/2839; B60N 2/2851; B60N 2/2884; B60N 2/28; B60N 2/2812; B60N 2/2821; B60N 2/2845; B60N 2/2848
See application file for complete search history.

(56) References Cited

U.S. PATENT DOCUMENTS

| | | | | |
|---|---|---|---|---|
| 5,595,393 A | * | 1/1997 | Batten | B60N 2/2845 280/30 |
| 6,447,001 B1 | * | 9/2002 | Hsia | B62B 9/28 16/422 |
| 2004/0178593 A1 | | 9/2004 | Szmidt et al. | |
| 2007/0278756 A1 | * | 12/2007 | Erskine | B60N 2/2806 280/47.25 |
| 2010/0019547 A1 | | 1/2010 | Gray et al. | |
| 2010/0052373 A1 | | 3/2010 | Kono et al. | |
| 2012/0205947 A1 | | 8/2012 | Coote et al. | |
| 2012/0267877 A1 | | 10/2012 | Mazer et al. | |
| 2013/0229033 A1 | | 9/2013 | Lee | |
| 2015/0091267 A1 | | 4/2015 | Conner | |

* cited by examiner

Primary Examiner — John Walters
Assistant Examiner — James Triggs
(74) Attorney, Agent, or Firm — Law Office of Jeff Williams; J. Oliver Williams

(57) ABSTRACT

The present application includes a system and method for transporting a car seat outside of a vehicle. The system includes a wheel assembly configured to couple to a portion of the car seat. The wheel assembly attaches to existing base attachment portions on the car seat to minimize any need for retrofit operations. The system further includes a mobility handle configured to adjust in length and couple to a portion of the car seat. The mobility handle is designed to allow an individual to guide and control the movement of the car seat on the wheel assembly.

20 Claims, 5 Drawing Sheets

CAR SEAT MOBILITY SYSTEM

BACKGROUND

1. Field of the Invention

The present application relates generally to infant child seats and, more particularly, to a system and method for transporting the infant child seat outside of the vehicle.

2. Description of Related Art

Various local and national laws require children to be secured within a vehicle while in motion. This has led to the development of various types of car seats for children of different ages. Examples are booster seats, carrier car seats for infants, and fully secured child seats. Each has selected age and weight applications as kids grow. Booster seats and fully secured child seats are typically left in the vehicle and do not provide any ability to carry a child outside of the vehicle. Carrier car seats are different in that they are used to selectively detach from a base in the vehicle. The base remains in the vehicle while the seat with the infant is removed. These seats are used to transport the child outside of the vehicle.

Carrier car seats have many advantages including the convenience afforded to parents and other adults in being able to move the child without disturbing him/her. However, as the name implies, the adult is required to carry the child wherever they go. In an effort to ease the burden and strain on adults from carrying the child and the seat everywhere, specialized strollers were developed to permit the selective attachment of the carrier car seat to the stroller. Although this allows for some relief to adults, it necessitates the bulky carrying and transportation of the stroller in the vehicle. Not all vehicles have room.

It is desirable to provide a more convenient and less bulky system and method of transporting an infant child in a carrier car seat outside of the vehicle. Although great strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
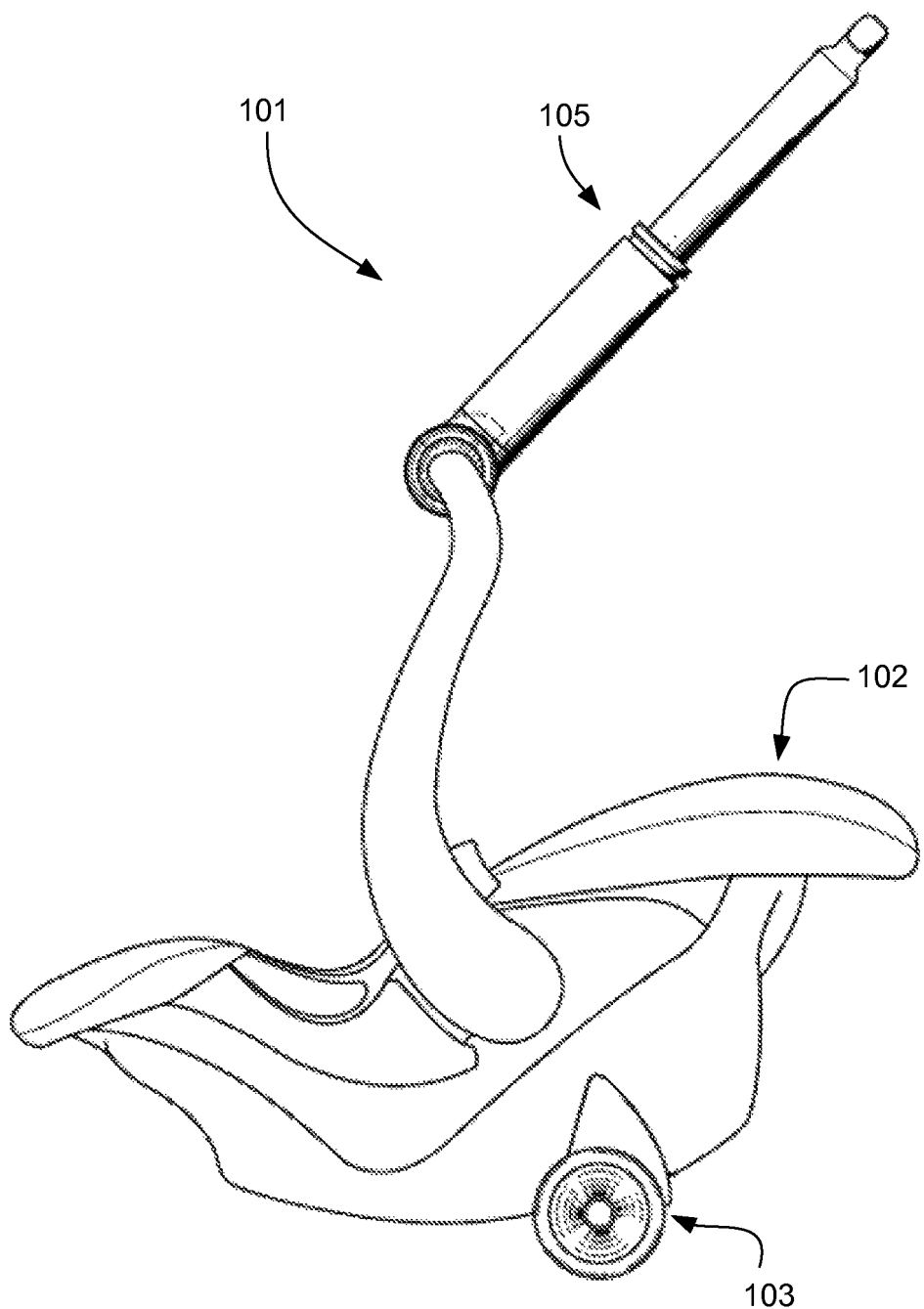
FIG. 1 is a chart of a car seat mobility system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system in accordance with the present application overcomes one or more of the above-discussed problems commonly associated with conventional medical assessment practices and procedures. Specifically, the system of the present application is configured to provide an ability to transport a carrier car seat outside of the vehicle in a manner that alleviates stresses and strains on an individual having to lift and hold the car seat. The system and method of the present application permits the car seat to be translated along the ground on one or more wheels. The system and method of the present application is useful as permitting mobility while minimizing the bulky transportation of equipment and maximizing convenience. These and other unique features of the system and method are discussed below and illustrated in the accompanying drawings.

The system and method will be understood, both as to its substance and operation, from the accompanying drawings, taken in conjunction with the accompanying description. Several embodiments of the system are contemplated herein. It should be understood that various components, items, and features of the system and method may be modified and/or interchanged with one another, all of which are within the scope of the present application, even though not all variations and particular embodiments are shown in the drawings. It should also be understood that the mixing and matching of features, elements, and/or functions to form various embodiments is expressly contemplated herein so that one of ordinary skill in the art would appreciate from this disclosure that the features, elements, and/or functions of one embodiment may be modified into another embodiment as appropriate, unless otherwise described.

The car seat mobility system of the present application is illustrated in the associated drawings. Referring now to the drawings wherein like reference characters identify corresponding or similar elements in form and function throughout the several views. FIG. 1 in the drawings illustrates a car seat mobility system 101. System 101 is used to transport a child in a car seat 102 outside of a vehicle. The system includes the use of a wheel assembly 103 and a mobility handle 105. Both wheel assembly 103 and mobility handle 105 are configured to operate together to permit the selective transportation of the child in car seat 102.

In order to operate system 101 with car seat 102, an individual can engage and disengage the wheel assembly 103 from car seat 102 as it is coupled to and detached from the base in the car. The base is typically anchored in the vehicle with a seat belt and possibly one or more straps. Car seat 102 has base attachment portions 104 (see FIGS. 2-3) that are configured to snap into the base for securing itself while in the vehicle. System 101 incorporates wheel assembly 103 that are configured to couple to car seat 102. One such way of coupling is performed by translating wheel assembly 103 into base attachment portion 104 after car seat 102 has been removed from the vehicle. Prior to securing car seat 102 back in the vehicle on the base, wheel assembly 103 is selectively detached from car seat 102.

Figure 2:
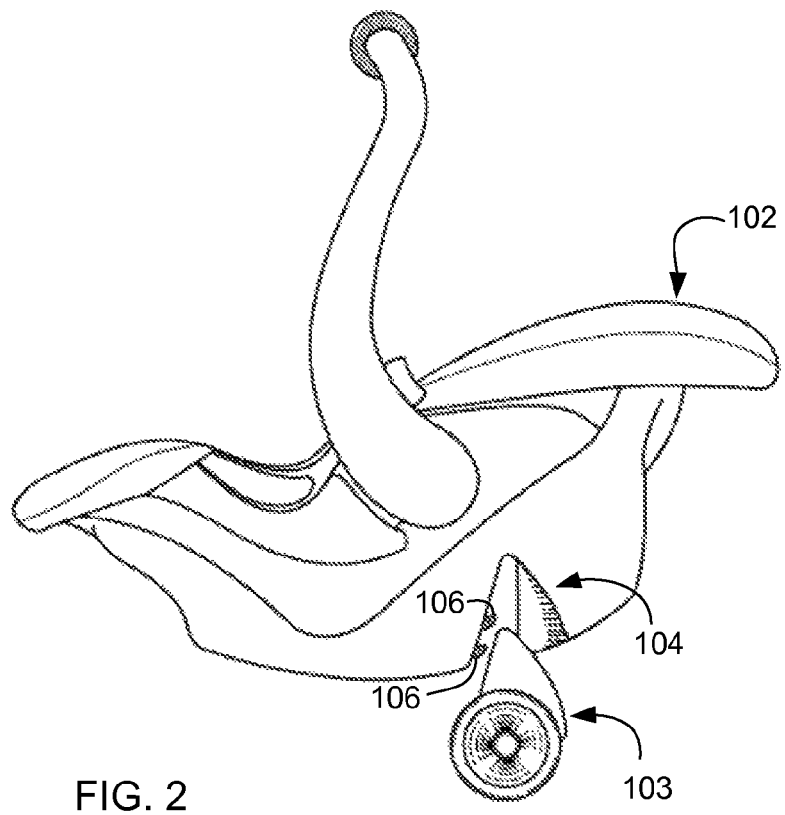
FIGS. 2 and 3 are side views of a wheel in the car seat mobility system of FIG. 1 engaging a car seat.
Figure 3:
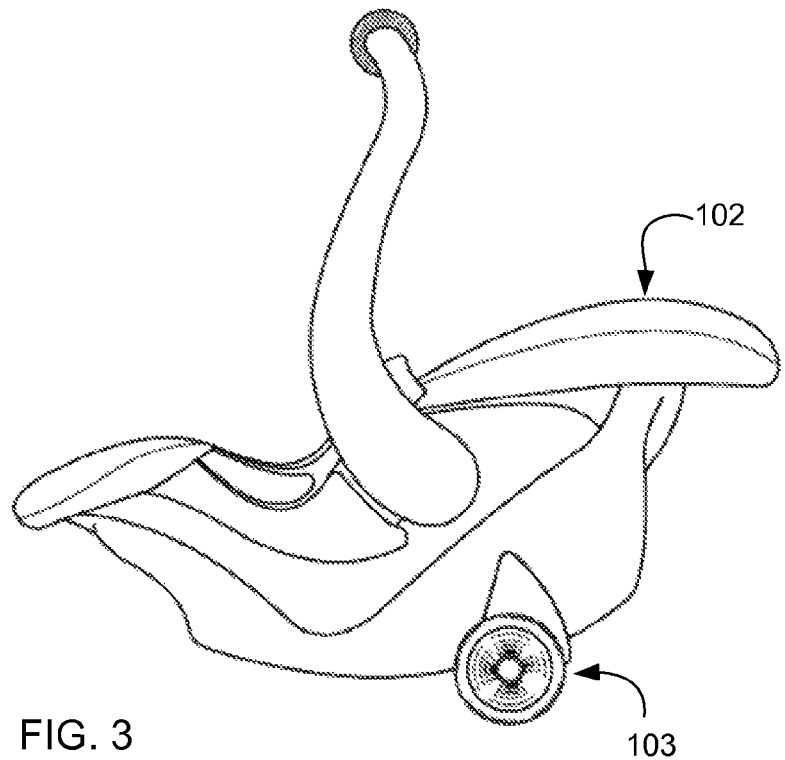

Referring now also FIGS. 2-3 in the drawings, side views of car seat mobility system 101 without the mobility handle 105 is illustrated. In particular, an example of coupling wheel assembly 103 to base attachment portion 104 is shown. Portion 104 is located along the bottom of car seat 102. Car seat 102 includes tabs 106 in portion 104 for progressively securing car seat 102 to the base. Wheel assembly 103 is configured to pass upward through portion 104 and snap into a temporary locking position relative to car seat 102. In this position, wheel assembly 103 is configured to selectively elevate car seat 102 relative to the ground or other surface.

Although wheel assembly 103 has been described as coupling into portion 104 of car seat 102, it is understood that other locations on car seat 102 may be selected. Other locations may require additional components to ensure a proper and secure fit. These embodiments are also contemplated herein system 101. It is preferred that wheel assembly 103 attaches through portion 104 to minimize modifications and in order to simplify its use.

Figure 4:
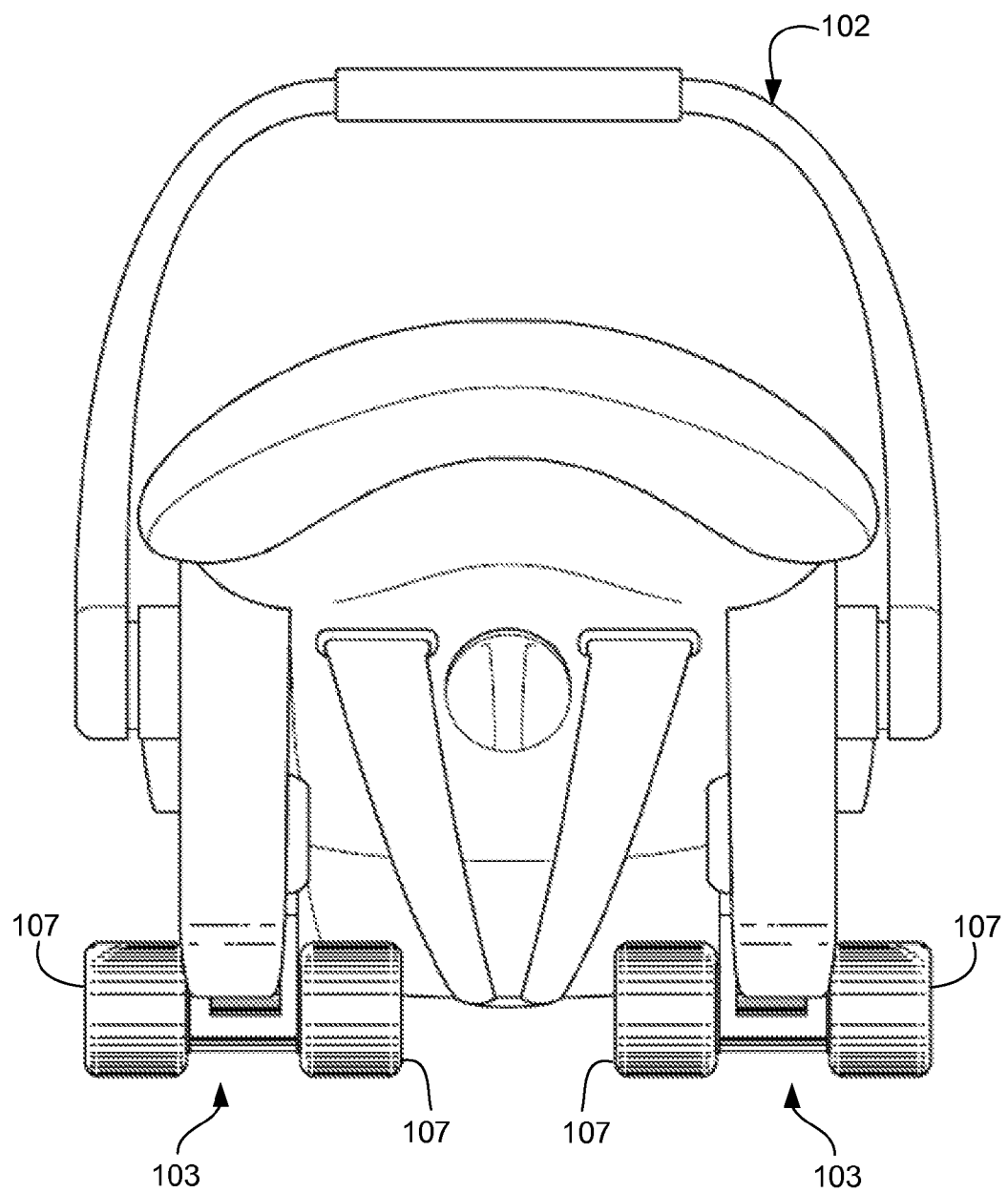
FIG. 4 is a rear view of the wheels of FIGS. 2 and 3 placed in the car seat.

Referring now also to FIG. 4 in the drawings, a rear view of car seat 102 as seen in FIGS. 2 and 3 is illustrated. System 101 may include the use of one or more wheel assemblies 103 as shown. As depicted, wheels 107 are axially restricted in that rotation about a horizontal axis is maintained. Wheel assembly 103 may be modified to include additional degrees of freedom wherein wheel assembly 103 may permit a swivel feature for wheels 107. These other embodiments are also contemplated herein. Despite the known variations to the types of wheels and its many various possible degrees of freedom, wheel assembly 103 is configured to separate car seat 102 from the ground and permit car seat 102 to selectively roll along the ground with the proper application of force to mobility handle 105.

Figure 5:
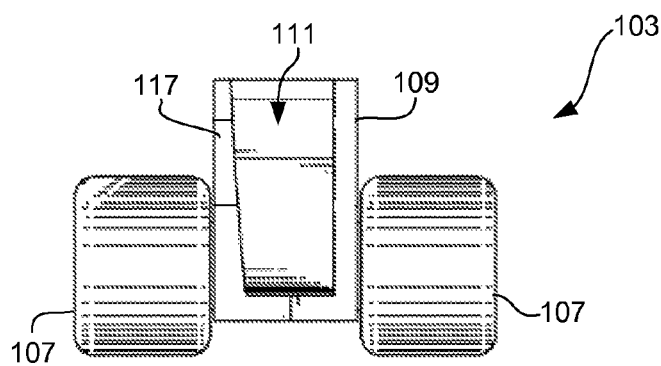
FIGS. 5-7 are enlarged rear, front, and side views of the wheels of FIGS. 2 and 3 respectively.
Figure 6:
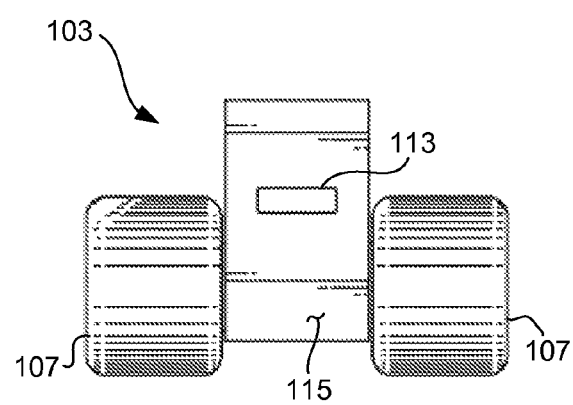
Figure 7:
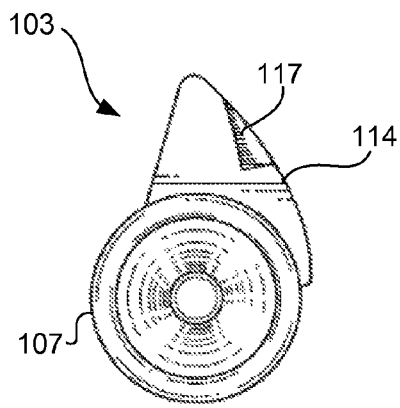

Referring now also to FIGS. 5-7 in the drawings, enlarged views of wheel assembly 103 is illustrated. In the embodiment where wheel assembly 103 couples to car seat 102 via portion 104, wheel assembly 103 is configured to have a few key features to allow it to engage portion 104. As seen in the Figures, wheel assembly 103 is shown having two wheels 107 separated by central body 109. Central body 109 is hollowed out to form a groove 111 along a rear surface 114 and a recess 113 along a front flat surface 115. Groove 111 is configured to accept car seat 102 to pass within and between the two sides of groove 111. Recess 113 is configured to accept tabs 106. Wheel assembly 103 may be installed with a slight application of force into seat 102. Removal is made simply by pulling wheel assembly 103 away from seat 102. Of not is notch 117. Notch 117 is optionally included and is used to ease acceptance of seat 102 through groove 111. Wheel assembly 103 is not limited to the use of two wheels. Wheel assembly 103 may use one or more wheels 107.

Figures 8, 9, 10:
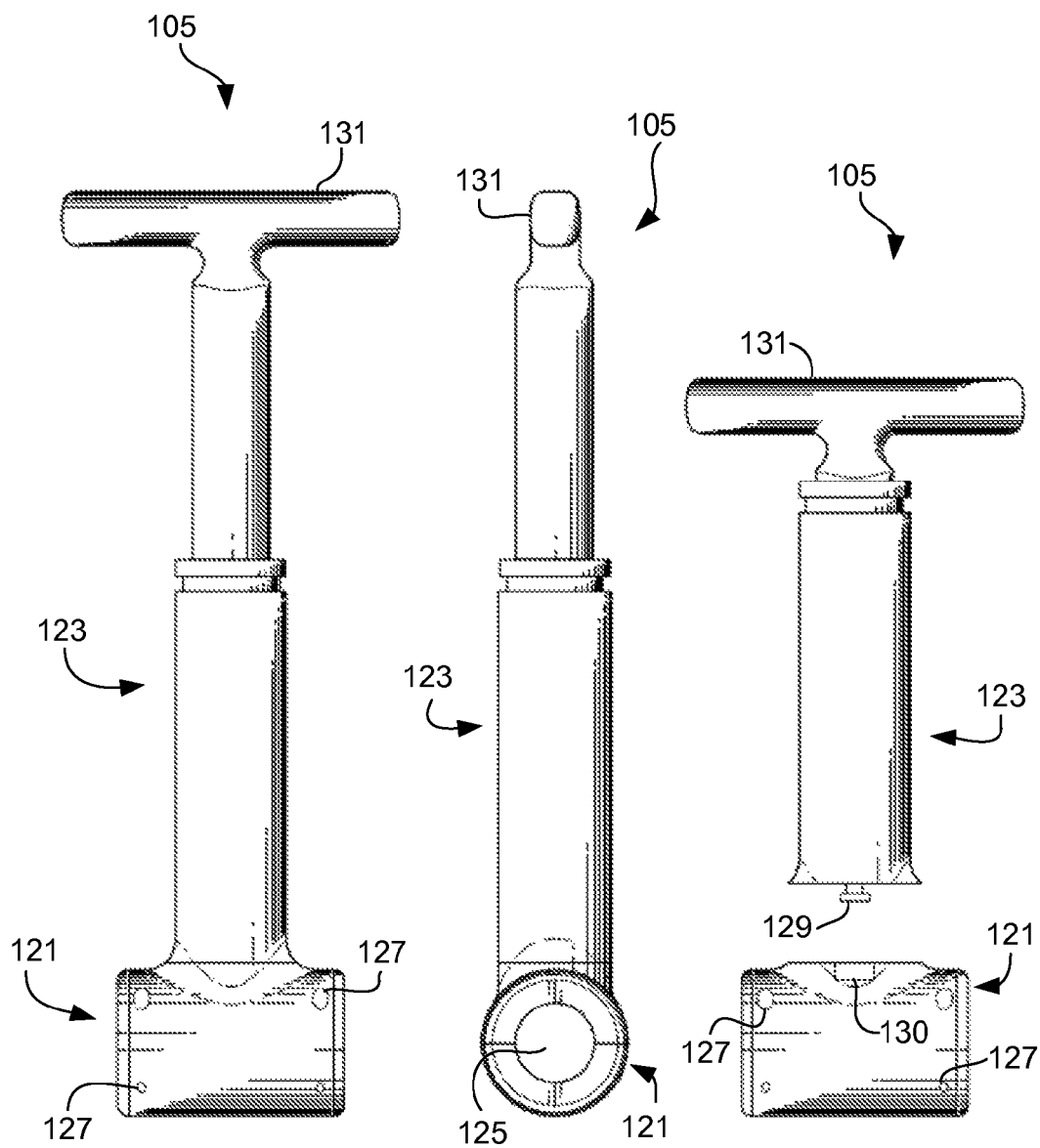
FIGS. 8-10 are enlarged views of a handle in the car seat mobility system of FIG. 1.

Referring now also to FIGS. 8-10 in the drawings, mobility handle 105 is illustrated. Mobility handle 105 is used in combination with wheel assembly 103 to permit for the comfortable movement of car seat 102. It is understood that car seat 102 may be operable and moveable with only wheel assembly 103, however this entails the need for an individual to bend over and push/pull seat 102. Although optionally included in system 101, it is preferred and recommended that mobility handle 105 be operable and included at all times with wheels 103.

Mobility handle 105 is coupled to a portion of seat 102 (i.e. the seat handle). Mobility handle 105 is configured to provide control of the car seat to an individual. The individual is able to manipulate the movement of the car seat on the wheel by adjusting the forces applied to mobility handle 105. Mobility handle 105 is detachable from car seat 102 and adjustable in its position on seat 102. Mobility handle 105 is designed to extend away from car seat 102 to permit comfortable operation by an individual. This may be done through the use of one or more separable members. Although there are many different types of styles and capabilities with handles in general, each of which is contemplated herein, a particularly useful design is shown.

Mobility handle 105 as seen in FIGS. 8-10 are configured to have at least two separable components or members, namely at least a base member 121 and an upper member 123. Other members are contemplated and the use of only two members herein is not meant to be limiting. Base member 121 is configured to be composed of two halves that when affixed together create a central void 125. Void 125 is used and sized to accommodate one or more portions of seat 102, ideally or typically that of the handle of seat 102. The halves of base member 121 are affixed via the use of fasteners passed through apertures 127. These fasteners are removable allowing the individual to selectively remove base member 121. Additionally, the fasteners may be loosened to adjust the orientation of mobility handle 105 in relation to seat 102.

Upper member 123 is configured to be selectively detachable from that of base member 121. It is understood that mobility handle 105 is coupled to seat 102 and that seat 102 is frequently brought into and out of a vehicle. The length and/or orientation of mobility handle 105 may be a limiting factor or hindrance in the vehicle. Therefore, upper member 123 is removable to permit storage while seat 102 is installed in the vehicle along with the wheel assembly 103. Upper member 123 may operate in various conventional ways. Member 123 herein is configured to include a shaped peg 129 configured to mate with a recess 130 in base member 121. Upper member 123 and peg 129 are designed to pass down through a portion of the recess 130 in a first orientation and then snap into place when rotated into a second orientation. When secured, upper member 123 and base member 121 are flushly contacted as seen in FIGS. 8 and 9.

In an effort to accommodate the different sizes of adults and individuals using system 101, mobility handle 105 is configured to adjustable in length. An individual may adjust the length of upper member 123 to accommodate their height and comfort. Upper member 123 is depicted with the ability to telescope from one length to another. An infinite number of lengths are possible. Grip 131 is located at the upper most portion of upper member 123 for the individual to grab and control seat 102.

There are many advantages with using system 101. System 101 is simplistic and configured to operate seamlessly with existing car seats 102. To use, an individual merely attaches wheel assembly 103, having at least one wheel 107, to a portion of car seat 102. Mobility handle 105 is then oriented into position, which may include attaching upper member 123 to base member 121. An individual grabs a portion of mobility handle 105 and positions car seat 102 on wheel assembly 103 and applies the desired force to induce motion along the wheels. Prior to placing car seat 102 back into a vehicle, wheel assembly 103 is removed for storage. Mobility handle 105 may optionally be disassembled partly by separating members 123 and 121 and storing as well. It is interesting to note that car seat 102 is inherently unbalanced on wheel assembly 103 thereby causing car seat 102 to tilt at a slight angle and contact the ground. This contact helps to prevent car seat 102 from rolling away unintentionally. All that is required to move car seat 102 is to tilt it onto wheel assembly 103.

The current application has many advantages over the prior art including at least the following: (1) increased convenience; (2) no need to transport a stroller; (3) ability to transport a car seat without difficulty; (4) no required modifications necessary to the car seat; and (5) adjustability to accommodate individuals of various heights.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A car seat mobility system for transporting a car seat outside of a vehicle, comprising:
    a wheel assembly releasably coupled without mechanical fasteners to a base attachment portion of the car seat, the base attachment portion configured to engage and secure the car seat to a base, the wheel assembly configured to elevate the car seat off the ground, the wheel assembly including a central body having a groove along a rear surface and a recess along a front surface, the groove and recess configured to releasably engage the base attachment portion of the car seat; and
    a mobility handle coupled to a handle on the car seat, the mobility handle configured to selectively pivot about the handle, the mobility handle configured to provide control of the car seat to an individual, the individual able to manipulate the movement of the car seat on the wheel assembly;
    wherein the mobility handle and the wheel assembly operate together to permit the selective movement of a child in the car seat outside of the vehicle.
2. The system of claim 1, wherein the wheel assembly is detachable from the car seat.
3. The system of claim 1, wherein the wheel assembly is located along a bottom exterior surface of the car seat.
4. The system of claim 1, wherein the car seat is oriented onto the wheel assembly during transportation of the car seat.
5. The system of claim 1, wherein the car seat is configured to selectively roll along the ground.
6. The system of claim 1, wherein a wheel on the wheel assembly is configured to swivel.
7. The system of claim 1, wherein the mobility handle is detachable from the car seat.
8. The system of claim 1, wherein the mobility handle is configured to adjust in length.
9. The system of claim 1, wherein the mobility handle is configured to be a telescoping handle.
10. The system of claim 1, wherein the mobility handle includes a base member coupled to the car seat handle and an upper member configured to selectively engage the base member.
11. A method of transporting a child outside of a vehicle, comprising:
    attaching a wheel assembly to a base attachment portion of a car seat, the wheel assembly including a central body having a groove along a rear surface and a recess along a front surface, the groove and recess configured to releasably engage the base attachment portion of the car seat;
    positioning the car seat onto the wheel assembly;
    orienting a mobility handle relative to the car seat to permit operation by an individual, the mobility handle configured to pivot independently about a car seat handle; and
    applying a force to the mobility handle sufficient to move the car seat on the wheel assembly.
12. The method of claim 11, wherein the wheel assembly is configured to elevate the car seat relative to an exterior surface.
13. The method of claim 11, wherein the wheel assembly is removable from the car seat.
14. The method of claim 11, wherein the mobility handle is detachable from a handle of the car seat.
15. The method of claim 11, wherein the mobility handle includes a base member in contact with a portion of the car seat handle and an upper member in selective communication with the base member.
16. The method of claim 15, wherein the upper member is selectively detachable from the base member.
17. The method of claim 15, wherein the upper member is configured to selectively elongate to adjust to the height and size of multiple individuals.
18. The method of claim 11, wherein the mobility handle is configured to adjust in length.
19. The method of claim 11, further comprising:
    removing the wheel assembly prior to securing the car seat in the vehicle.
20. The method of claim 11, further comprising:
    storing the wheel assembly and a portion of the mobility handle when the car seat is not being transported.

* * * * *